United States Patent [19]

Haka et al.

[11] 4,397,289
[45] Aug. 9, 1983

[54] SELF-CALIBRATING EXHAUST GAS RECIRCULATION SYSTEM

[75] Inventors: Raymond J. Haka, Rochester, Mich.; Donald D. Stoltman, Henrietta, N.Y.

[73] Assignee: General Motors Corporation, Detroit, Mich.

[21] Appl. No.: 312,275

[22] Filed: Oct. 16, 1981

[51] Int. Cl.³ ............................................ F02M 25/06
[52] U.S. Cl. ...................................... 123/571; 123/568
[58] Field of Search ................................ 123/571, 568

[56] References Cited

U.S. PATENT DOCUMENTS 4,142,495 3/1979 Lahiff .................................. 123/571
4,164,918 8/1979 Haka ................................... 123/571

Primary Examiner—Wendell E. Burns
Attorney, Agent, or Firm—Howard N. Conkey

[57] ABSTRACT

A motor vehicle combustion engine has an exhaust gas recirculation system in which the flow of recirculated exhaust gas is controlled through an orifice having exhaust back pressure on one side and a control pressure on the other as determined by an EGR valve. A pressure transducer compares the control pressure with a reference pressure provided in part by an electromagnetic force to provide an operating pressure for positioning the EGR valve to obtain a control pressure equal to the reference pressure. At engine idle, the EGR valve is closed and the control pressure is equal to the exhaust back pressure. When this condition exists, the electromagnetic force is varied until the reference pressure is substantially equal to the control pressure, the magnitude of the electromagnetic force being a measure of the control pressure at idle and which comprises a calibration value that is stored for use as a reference for controlling exhaust back pressure during other engine operating conditions.

3 Claims, 4 Drawing Figures

SELF-CALIBRATING EXHAUST GAS RECIRCULATION SYSTEM

This invention relates to exhaust gas recirculation systems for motor vehicle combustion engines and particularly to such systems that utilize the differential between exhaust back pressure and a control pressure acorss a flow restricting orifice in the EGR conduit to control the flow of recirculated exhaust gas.

Recirculation of exhaust gases has been developed as a method for inhibiting formation of oxides of nitrogen during the combustion process of an internal combustion engine. In general, it is desirable to recirculate exhaust gases at a rate proportional to the rate of engine induction air flow. To accomplish that purpose, exhaust gas recirculation (EGR) control assemblies have included an EGR control valve pintle positioned to provide exhaust gas recirculation at rates which maintain the control pressure in the EGR passage upstream of the pintle equal to a constant reference pressure. Recirculation of exhaust gases has thus been varied with exhaust back pressure, which in turn varies as a function of induction air flow to provide exhaust gas recirculation substantially proportional to induction air flow.

Known EGR control assemblies generally include a transducer for regulating a subatmospheric operating pressure by which the control valve pintle is positioned. The transducer employs an air bleed valve member to regulate the operating pressure, opening an air bleed to increase the operating pressure which causes the control valve pintle to reduce exhaust gas recirculation when the induction air flow (and thus the engine exhaust back pressure) decreases and the control pressure accordingly begins to fall below the reference pressure, and closing the air bleed which reduces the operating pressure and causes the control valve pintle to increase exhaust gas recirculation when the induction air flow (and thus the engine exhaust back pressure) increases and the control pressure accordingly starts to rise above the reference pressure. The bleed valve is typically controlled by a diaphragm subjected on one side to the control pressure in the EGR passage and balanced on the opposite side by atmospheric pressure, the bias of a spring and by an electromagnetic force, the combination of atmospheric pressure, the spring bias and the electromagnetic force forming a reference pressure.

The reference pressure in the foregoing known systems is adjusted when a change in the proportion of EGR is desired, the control valve pintle then being moved to the position required to provide the new rates of exhaust gas recirculation necessary to establish a control pressure equal to the adjusted reference pressure.

It is difficult to provide EGR control systems such as described above having identical characteristics. For example, the gain of the solenoid in the transducer producing the variable electromagnetic force typically varies from one transducer to another. Further, the characteristics of the engine or exhaust system which determine exhaust back pressure may change over time. As a result of these system variances, the proportion of exhaust gas recirculation deviates from the desired scheduled value. Accordingly, it is the general object of this invention to provide an improved EGR control system employing a pressure transducer for establishing a desired EGR control pressure in which the transducer is recalibrated during engine operation to compensate for system-to-system variances.

It is another object of this invention to provide an EGR control system in which the EGR proportion is controlled by the value of a control pressure that is compared in a pressure transducer with a reference value established in part by a controlled electromagnetic force and in which the value of the electromagnetic force is adjusted during a predetermined engine operating condition at which the control pressure is equal to the exhaust back pressure of the engine to establish a calibration value to be used during other engine operating conditions to generate the electromagnetic force providing the desired EGR proportion.

These and other objects of this invention are best understood by the following description of a preferred embodiment and the drawings in which.

Figure 1:
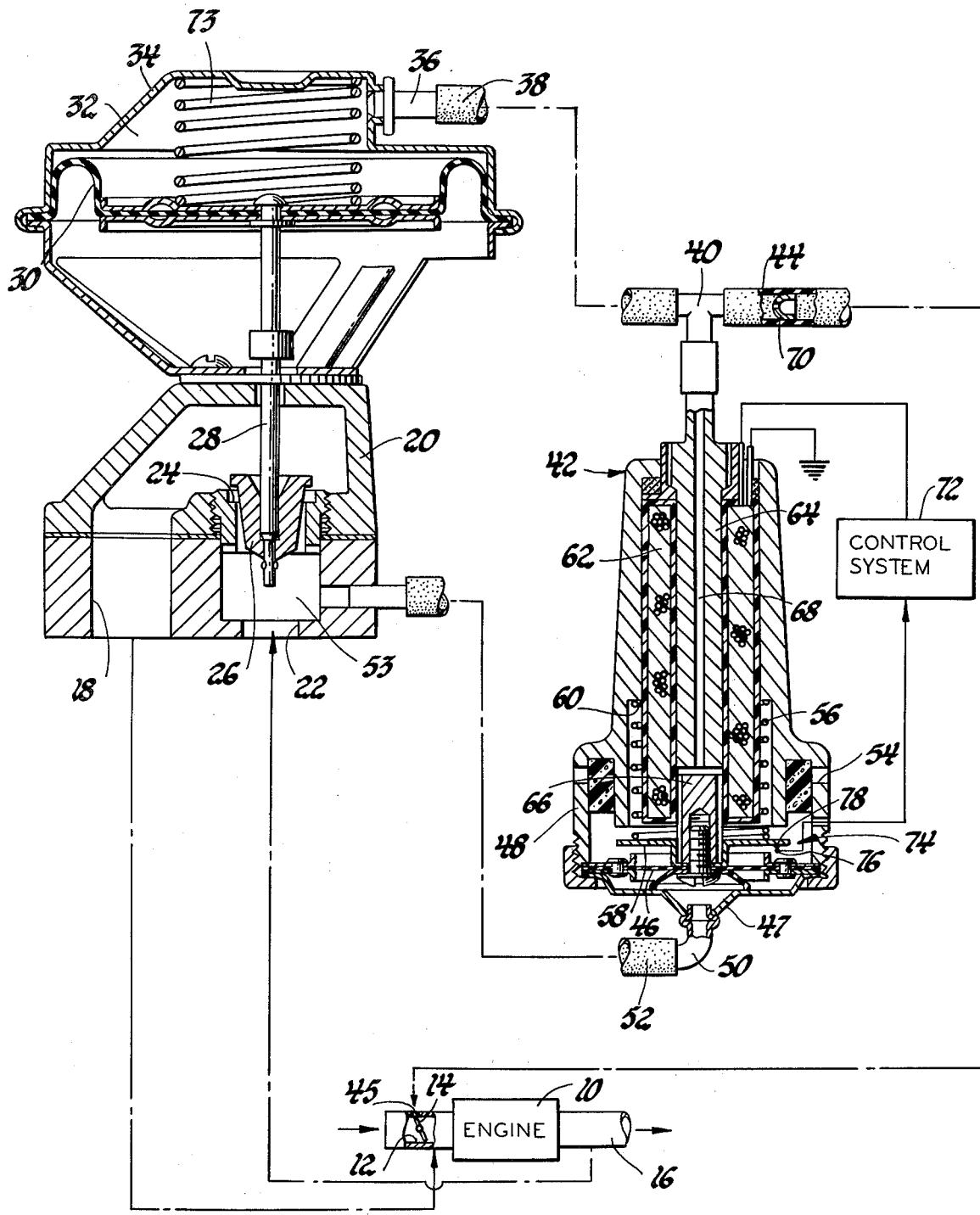
FIG. 1 illustrates an exhaust gas recirculation system employing the principles of this invention.

Referring to FIG. 1, an internal combustion engine 10 has an air induction passage 12, a throttle 14 controlling induction air flow through the passage 12, and an exhaust passage 16. An exhaust gas recirculation (EGR) passage 18 extends from the exhaust passage 16 through an EGR valve body 20 to the induction passage 12 downstream of the throttle 14.

An orifice 22 is disposed in the EGR passage 18 upstream of a valve seat 24. A control valve pintle 26 is associated with the valve seat 24 and has a stem 28 extending to an operating diaphragm 30. Diaphragm 30 forms part of an operating pressure chamber 32 closed by a cover 34.

A fitting 36 on the cover 34 is connected through a conduit 38 to a T-fitting 40 forming part of a transducer 42. The T-fitting 40 in turn is connected through a conduit 44 to a port 45 in the induction passage 12 which is traversed by the throttle 14. Accordingly, the operating pressure chamber 32 is exposed to the subatmospheric induction passage pressure downstream of the throttle 14 during open throttle operation and to the substantially atmospheric pressure upstream of the throttle 14 during idle and other closed throttle modes of operation.

The transducer 42 has a control diaphragm 46 clamped between a cover 47 and a transducer housing 48. A fitting 50 on the cover 47 is connected through a conduit 52 to sense the control pressure in a control pressure zone 53 of the EGR passage 18 intermediate the orifice 22 and the valve seat 24, thus subjecting the control pressure chamber beneath the diaphragm 46 to the control pressure. The chamber above the diaphragm 46 is exposed to atmospheric pressure through openings 54. The atmospheric pressure opposes the control pressure applied through the conduit 52. The control pressure is further opposed by a spring 56 which engages a spring seat 58 and an abutment 60 in the housing 48 and urges the diaphragm 46 downward. A third force operates on the upper side of the diaphragm 46 and is provided by means of a solenoid winding 62 positioned about a core 64 and which operates on a movable armature 66 secured to the diaphragm 46. Energization of the winding 62 attracts the armature 66 upward toward the core 64 and against the force of the spring 56.

The position of the armature 66 functions to control air flow from the chamber above the diaphragm 46 through a bleed passage 68 which extends to the T-fitting 40. Energization of the winding 62 establishes a force on the armature 66 tending to move the diaphragm 46 in direction for closing the bleed passage 68.

The chamber 32 creates an operating pressure from the subatmospheric induction passage pressure sensed through an aperture 70 in the conduit 44 and the atmospheric pressure sensed through the bleed passage 68. When the control pressure in the pressure zone 53 exceeds the reference pressure established by atmospheric pressure, the spring 56 and the electromagnetic force established by the current through the winding 62, the diaphragm 46 is moved upward to move the armature 66 to obstruct air flow through the bleed passage 68. The subatmospheric pressure signal sensed through the aperture 70 thereupon reduces the operating pressure in the chamber 32 and the diaphragm 30 then lifts the valve pintle 26 against the force of a spring 73. The area between the control valve pintle 26 and the valve seat 24 is increased to increase the recirculation of exhaust gases through the EGR passage 18 and reduce the control pressure in the zone 53. When the control pressure in the zone 53 decreases below the reference pressure established by the atmospheric pressure above the diaphragm 46, the spring 56 and the electromagnetic force established by the level of the current through the winding 62, the diaphragm 46 displaces the armature 66 away from the bleed passage 68 and the resulting air flow through the bleed passage 68 increases the operating pressure in the chamber 32. Accordingly, the spring 73 displaces the valve pintle 26 toward the valve seat 24 to reduce the area therebetween which reduces recirculation of exhaust gases through the passage 18 and increases the control pressure in the zone 53. As a result, the control valve pintle 26 is positioned to provide exhaust gas recirculation at rates which maintain the control pressure in the zone 53 substantially constant at the level determined by the reference pressure comprised of the forces on the diaphragm 46 established by atmospheric pressure, the spring 56 and the controlled electromagnetic force established by the current through the winding 62. The foregoing operation describes a closed loop system for controlling the control pressure in the zone 53 by comparing the control pressure with the reference pressure and adjusting the area between the valve pintle 26 and the valve seat 24 to reduce the sensed error to zero.

In order to vary the proportion of exhaust gases recirculated, a control system 72 responds to selected engine operating parameters and provides a duty cycle modulated voltage signal to the winding 62 to vary the electromagnetic force acting on the armature 66 and thereby vary the reference pressure with which the control pressure in zone 53 is compared. The frequency of the duty cycle modulated voltage signal is such that the current through the winding 62 is filtered and is substantially a DC current having a level that is proportional to the duty cycle. Accordingly, by varying the duty cycle of the voltage signal energizing the winding 62, the current level and accordingly the electromagnetic force acting on the armature 66 is varied to control the proportion of exhaust gases recirculated.

Typical of exhaust gas recirculation systems such as illustrated in FIG. 1 is that the characteristics of the system and particularly of the transducer 42 may vary from system to system so that for a given duty cycle energization of the winding 62, the reference pressure provided differs from system to system. For example, the impedance of the winding 62 may vary among transducers as well as the gain characteristics. Accordingly, the EGR proportion provided may vary from the proportion scheduled by the control system 72. Additionally, the back pressure characteristics of exhaust conduits may change with age or condition which varies the EGR proportion provided from the proportion scheduled by the control system 72.

In order to correct for the variances in the exhaust gas proportions recirculated by the system of FIG. 1, the control system 72 calibrates the EGR control system when the engine is at idle during which the throttle 14 is closed and atmospheric pressure is provided to the chamber 32 through the aperture 70. During this closed throttle condition where the chamber 32 is at atmospheric pressure, the spring 73 biased the control valve pintle 26 against the valve seat 24 to inhibit exhaust gas recirculation resulting in the control pressure in the zone 53 being equal to the exhaust back pressure at idle.

The control system 72 calibrates the EGR control system by determining the duty cycle of the signal applied to the winding 62 that is required to establish a reference control pressure value having a predetermined relationship to the pressure in the zone 53 which is equal to the exhaust back pressure at idle. To sense the predetermined relationship, a set of contacts 74 are provided including a stationary element 76 insulated from the transducer 42 and a movable electrically grounded contact element 78 carried by the spring retainer 58.

At engine idle and with the exhaust back pressure applied to the diaphragm 46 through the conduit 52, the control system 72 deenergizes the winding 62. Since the reference pressure represented by the force of the spring 56 and atmospheric pressure is greater than idle back pressure, the diaphragm 46 is moved downward so that the contact elements 76 and 78 are closed. The control system 72 then increases the energization of the winding 62 until such time that the contact elements 76 and 78 open. The value of the signal applied to the winding 62 when the contacts 76 and 78 open comprises a system calibration value that is stored by the control system 72 which, during other engine operating conditions, uses the stored calibration value in determining the control signal duty cycle establishing a desired proportion of recirculated exhaust gases.

Figure 2:
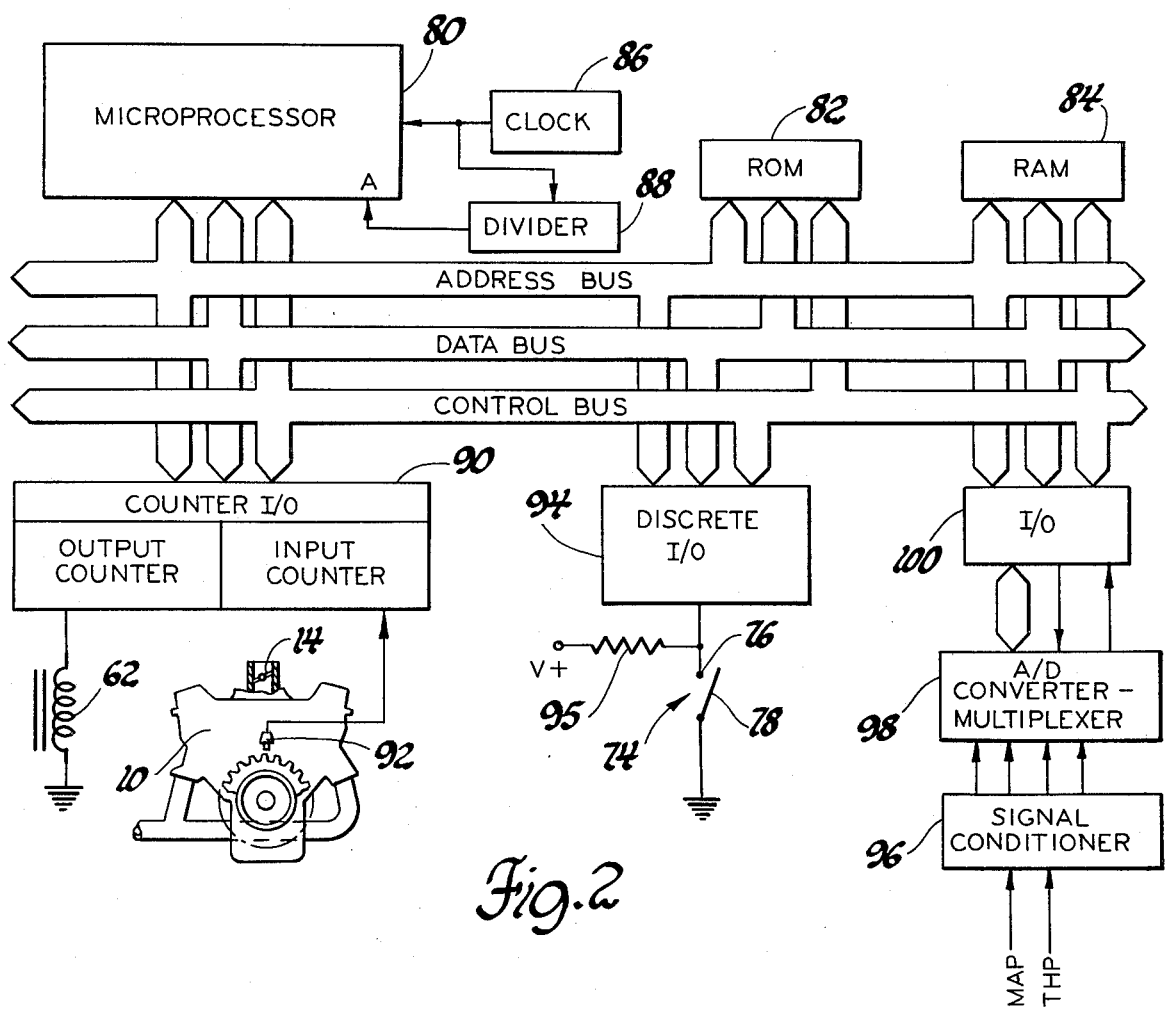
FIG. 2 illustrates an embodiment of a control system for use in the system of FIG. 1.

Referring to FIG. 2, the control system 72 for controlling the proportion of exhaust gases recirculated in accord with a predetermined schedule and for calibrating the EGR system is illustrated. The control system takes the form of a digital controller that includes a microprocessor 80 which executes the EGR control function by executing an operating program permanently stored in an external read-only memory (ROM) 82. The ROM 82 also contains a lookup table addressed in accord with engine speed and the absolute pressure in the manifold of the engine 10 and which stores a command deviation from a calibration value determined in accord with this invention. The stored control values in the form of duty cycle offset values from the calibration value are predetermined values determined to produce desired proportions of exhaust gases at specific values of engine speed and manifold absolute pressure.

Internal to the microprocessor 80 are conventional counters, registers, accumulators, flag flip flops, etc. Such a microprocessor may take the form of a Motorola MC-6800 Series Microprocessor. The digital controller also includes a random access memory (RAM) 84 into which data may be temporarily stored and from which data may be read at various address locations determined in accord with the program stored in the ROM 82. A clock oscillator 86 supplies a clock signal to the microprocessor 80 which establishes the timing of the digital controller operation and supplies the clock signal to a divider 88 which issues a periodic interrupt pulse to a maskable interrupt A input of the microprocessor. These interrupt pulses may be spaced at, for example, 12½ millisecond intervals.

A counter input/output circuit 90 is provided having an output counter section for providing timed output pulses such as for energizing the winding 62 of FIG. 1. In general, the output counter section of the counter input/output circuit 90 may include registers into which binary numbers representative of the desired pulse widths are periodically inserted. Thereafter at times determined by the microprocessor 80, the numbers are gated into down counters which are clocked by clock pulses with the output pulses of the output counter section having durations equal to the time required for the down counters to be counted down to zero. In this respect, the output pulse may be provided by a flip flop that is set when the number in the register is gated into the down counter and reset by a carry-out signal from the down counter when the number is counted to zero. The counter input/output circuit 90 also includes an input counter section which counts input pulses for a predetermined time period or, alternatively, counts clock pulses between input pulses for measuring, for example, engine speed. In the present embodiment, pulses having a frequency representing engine speed are provided by a speed pickup 92 which monitors the rotation of the flywheel of the engine 10 and provides pulses to the input counter section of the input/output circuit 90.

A discrete input/output circuit 94 is provided that includes a discrete input section for monitoring bi-level signals such as provided by the switch 74 of the transducer 42 having the contact elements 76 and 78 as previously described. When the contacts are open, a high voltage is provided through a pull-up resistor 95 and when the contacts are closed, a ground signal is provided.

To provide for the measurement of analog signals provided by various transducers, the digital controller includes a signal conditioner 96 which receives the various analog signals and whose outputs are coupled to an analog-to-digital converter-multiplexer 98. The particular analog condition sampled and converted is controlled by the microprocessor 80 in accord with the operating program via address lines from the input/output interface of an input/output circuit 100. Upon command, the addressed condition is converted to digital form and supplied to the input/output circuit 100 and then stored in ROM designated memory locations in the RAM 84. The analog signals supplied to the signal conditioner represent various operating parameters of the engine 10 and in the present EGR control system includes an engine mnifold absolute pressure signal MAP and a throttle position signal THP representing the angular position of the throttle blade of the engine 10. These signals are provided by conventional transducers.

The input/output circuits 90, 94 and 100 are conventional circuits for providing the respective functions. While the circuits have been illustrated as being separate, they may be combined in one or more input/output interface circuits.

The microprocessor 80, the ROM 82, the RAM 84 and the input/output circuits 90, 94 and 100 are interconnected by an address bus, a data bus and a control bus. The microprocessor 80 accesses the various circuits and memory locations in the ROM 82 and the RAM 84 via the address bus. Information is transmitted between circuits via the data bus and the control bus includes conventional lines such as read/write lines, reset lines, clock lines, power supply lines, etc.

Figure 3:
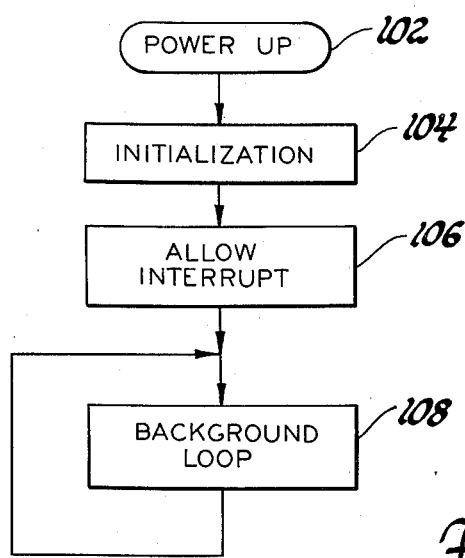
FIGS. 3 and 4 are diagrams illustrative of the operation of the control system of FIG. 2 in controlling engine exhaust gas recirculation.

Referring to FIG. 3, when power is first applied to the system such as upon closure of the vehicle ignition switch (not illustrated), the computer program is initiated at point 102 when power is first applied and then proceeds to a step 104 where the computer provides for initialization of the system. For example, at this step, system initial values stored in the ROM 82 are entered into ROM designated locations in the RAM 84 and counters, flags, and timers are initialized. After the initialization step 104, the program proceeds to step 106 where the program allows interrupts to occur such as by resetting the interrupt mask bit in the microprocessor condition code register. After the step 106, the program shifts to a background loop 108 which is continuously repeated. This loop may include the execution of routines such as diagnostic and warning routines.

While the system may employ numerous program interrupts at various spaced intervals, it will be assumed for purposes of illustrating this invention that an interrupt A is provided at 12½ millisecond intervals by means of the divider 88 of FIG. 1 during which the EGR control routine for controlling EGR in accord with this invention is executed.

Figure 4:
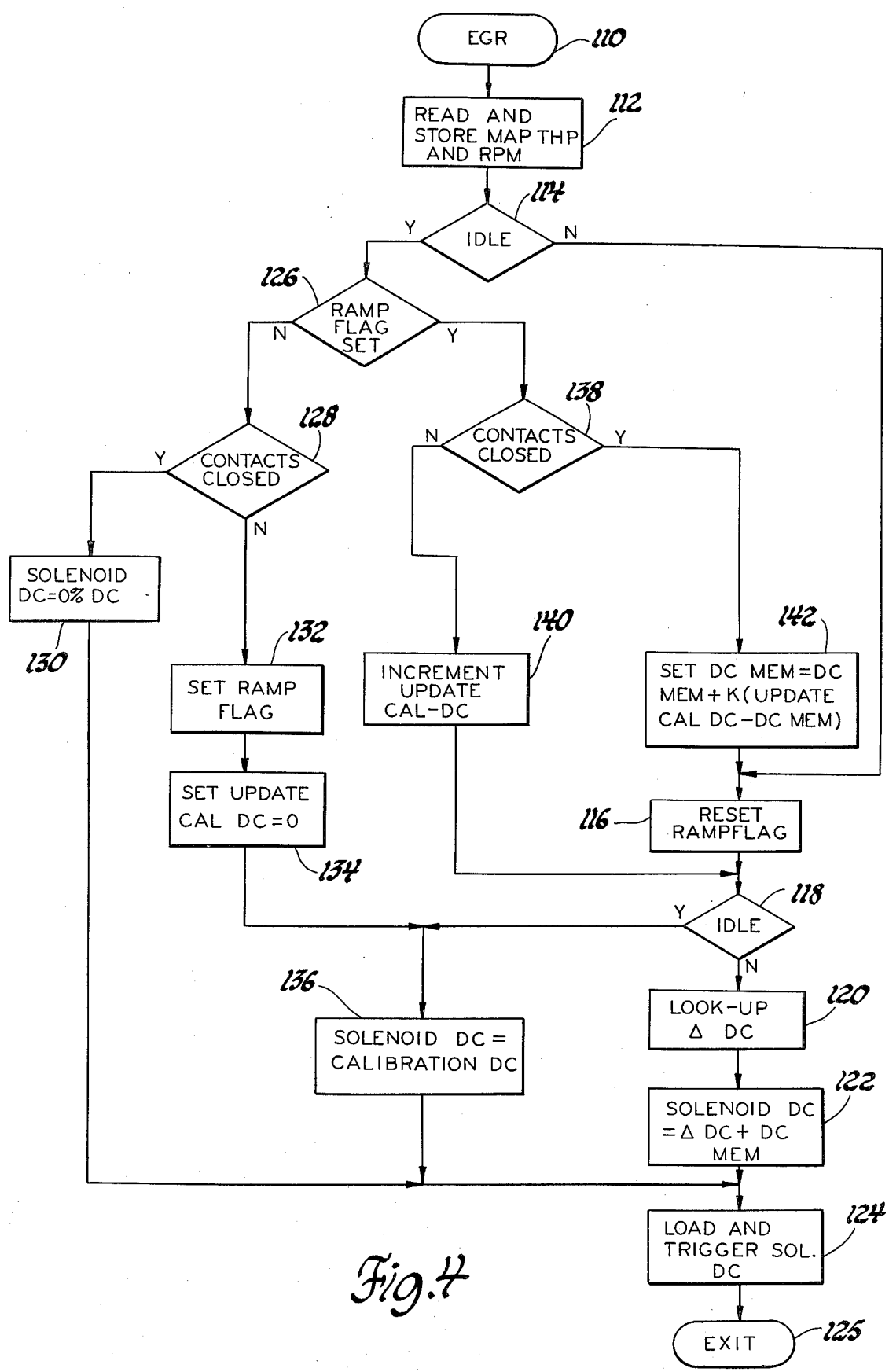

Referring to FIG. 4, the interrupt A routine comprising the EGR control routine that is repeated at 12½ millisecond intervals is illustrated. The signal applied to the winding 62 by this routine takes the form of a pulse width modulated voltage at a constant frequency thereby forming a duty cycle modulated EGR control signal. The routine is entered at point 110 and proceeds to step 112 where the computer executes a read routine where the state of the discrete input from the switch 74 to the discrete input/output circuit 94 is stored in a ROM designated memory location in the RAM 84, the engine speed determined via the input counter section of the input/output circuit 90 is stored at a ROM designated memory location in the RAM 84 and the manifold absolute pressure and throttle position inputs to the analog-to-digital converter-multiplexer 98 are each converted by the analog-to-digital converter-multiplexer 98 into binary numbers representative of the analog signal values and stored in respective ROM designated locations in the RAM 84.

The program next proceeds to a decision point 114 where it is determined whether or not the engine is at an idle condition. It will be assumed initially that the engine is not at idle. While the position of the throttle 14 may be utilized independently to indicate the idle condition of the engine, in the present embodiment, engine idle is represented by a closed throttle and an engine speed at or below a predetermined value. At step 114 it is determined that the parameters read and stored at step 112 do not represent engine idle and the program proceeds to a step 116 where a ramp flag associated with the calibration of the EGR system is reset. From this step, the program proceeds to a decision point 118 where it is again determined whether or not the engine is in an idle condition. Since the engine is not at idle, the program proceeds to steps 120 and 122 where the desired duty cycle pulse width establishing the desired control pressure reference value is determined as a function of the engine operating condition.

At step 120, the program executes a lockup routine where a duty cycle pulse width offset value from a calibration reference pressure value which has a predetermined relationship to the exhaust back pressure at idle, is obtained from a lookup table in the ROM 82 addressed as a function of engine speed and manifold absolute pressure. At each addressed memory location, a duty cycle pulse width offset value is stored representing a command deviation from the calibration value that establishes a desired scheduled proportion of EGR. This value is obtained from the lookup table in the ROM 82 and added at step 122 to a calibration duty cycle pulse width value stored in a duty cycle memory location in the RAM 84. The calibration duty cycle pulse width value stored in the duty cycle memory is periodically updated in accord with this invention and is the duty cycle pulse width value representing a reference pressure for the particular EGR system having a predetermined relationship to the exhaust back pressure at engine idle. The sum of the lookup table value and the value obtained from the calibration duty cycle memory is then stored in a solenoid duty cycle memory in the RAM 84.

Following step 122, the program proceeds to a step 124 where the duty cycle pulse width established as step 122 is retrieved from the solenoid duty cycle memory in the RAM 84, loaded into the output counter section of the input/output circuit 90 of FIG. 1 and triggered to apply a voltage pulse across the winding 62 having a duration in accord with the determined duty cycle pulse width set at step 122. Thereafter the EGR routine is exited at point 125.

As long as the engine condition remains off idle, the duty cycle pulse width established at steps 120 and 122 is provided at 12½ millisecond intervals to establish a duty cycle modulated signal for controlling the average current through the winding 62 at a level providing the control pressure in the zone 53 establishing the scheduled proportion of exhaust gases.

Assuming that the engine condition changes to idle, the program proceeds from decision point 114 to a decision point 126 where the state of the ramp flag previously reset at step 116 is sampled. Assuming the ramp flag is still reset, the program proceeds to a decision point 128 where the condition of the contacts 76 and 78 of the switch 74 applied to the discrete input/output circuit 94 is sampled. If the contacts are closed, the program proceeds to a step 130 where the solenoid duty cycle pulse width stored at the solenoid duty cycle memory location in the RAM 84 is set to zero. Thereafter at step 124 a 0 pulse width value is loaded into the input/output counter section of the circuit 90 so that the solenoid winding 62 is maintained deenergized and the reference pressure acting on the diaphragm 46 is comprised solely of atmospheric pressure on the force of the spring 56. The foregoing steps are repeated each 12½ milliseconds until such time that the contacts are detected closed at step 128 after which the program then proceeds to a step 132 where the ramp flag is set. Thereafter, at step 134 an update calibration duty cycle pulse width value in a ROM designated RAM location is set to zero. The program then proceeds to a step 136 where the update calibration duty cycle pulse width is stored in the solenoid duty cycle memory location in the RAM 84 after which at step 124 it is retrieved and is loaded into the output counter section of the circuit 90 and triggered. During the next interrupt period, at step 126 the program detects the set state of the ramp flag and proceeds to a decision point 138 where the state of the contacts 76 and 78 is detected. If the contacts 76 and 78 are closed, the program proceeds to the step 140 where the update calibration duty cycle pulse width stored in the RAM is incremented. The program then proceeds to decision point 118 and then to step 136, the engine being at an idle condition. Thereafter, the update calibration duty cycle pulse width incremented at step 140 is set into the solenoid duty cycle storage location in the RAM 84. This new value is loaded into the output counter section of the circuit 90 at step 124 which applies a voltage pulse across the winding 62 in accord with the increased update calibration duty cycle pulse width.

As long as the idle condition exists and as long as the contacts 76 and 78 remain closed, the update calibration duty cycle value stored in the RAM 84 is continuously ramped in increments established at step 140 to increase the current through the solenoid 62 to vary the reference pressure established by the transducer 42. At some value of the update calibration duty cycle pulse width, a reference pressure is established in the transducer 42 at which the diaphragm 46 opens the contacts 76 and 78. This is detected at step 138 after which the program proceeds to a step 142 where the calibration duty cycle pulse width stored in the duty cycle memory location in the RAM 84 is set equal to the duty cycle pulse width previously stored in the duty cycle memory location plus a constant k times the difference between the update calibration duty cycle pulse width and the duty cycle pulse width previously stored in the duty cycle memory, where k is an update time constant. Alternatively, the calibration duty cycle pulse width in the duty cycle memory may be set equal to the update calibration duty cycle pulse width. The calibration value then stored in the duty cycle memory represents a reference pressure value having a predetermined relationship to the exhaust back pressure at idle. Thereafter, at step 116, the ramp flag is reset and the program proceeds to decision point 118. As long as the engine remains at idle, the calibration duty cycle pulse width stored in the duty cycle memory is periodically updated.

When the engine operation shifts from the idle to off-idle condition, the program proceeds directly from step 114 to step 116 where the ramp flag is reset and then to decision point 118 where the off-idle condition is detected. From step 118 the program proceeds to steps 120 and 122 to determine the duty cycle pulse width value in accord with the sum of the schedule stored in the lookup table in the ROM 82 and the newly updated calibration duty cycle pulse width established during the idle condition. Thereafter, at step 124, the solenoid duty cycle pulse width is loaded into the input counter section of the circuit 90 to establish the scheduled control pressure reference and accordingly the desired proportion of exhaust gases.

As can be seen from the foregoing, each time that the engine returns to an idle condition, the calibration duty cycle pulse width establishing a reference pressure value having a predetermined relationship to the exhaust back pressure at idle (determined at the point the contacts 76 and 78 open) is determined so as to compensate for varying characteristics of the EGR control system and the exhaust system of the engine 10. In this manner, the scheduled proportion of exhaust gases established by the offset duty cycle pulse width values stored in the lookup table in the ROM 82 provide the desired proportion of exhaust gases independent of system-to-system variances.

The foregoing description of a preferred embodiment of the invention for the purpose of explaining the principles thereof is not to be considered as limiting or restricting the invention since many modifications may be made by the exercise of skill in the art without departing from the scope of the invention.

The embodiments of the invention in which an exclusive property or privilege is claimed are defined as follows:

1. In a motor vehicle combustion engine having an air induction passage, an exhaust passage, an EGR passage interconnecting the exhaust and induction passages effective to selectively return a portion of the exhaust gases from the exhaust passage to the induction passage through a flow restriction and an adjustable EGR valve which define a pressure chamber therebetween, and a transducer effective to adjust the EGR valve in response to a sensed error between a controlled reference pressure value and the pressure in the pressure chamber to establish an EGR rate producing a pressure in the pressure chamber that reduces the sensed error to substantially zero, the EGR valve being closed during a predetermined engine operating condition so that the pressure in the pressure chamber is equal to the exhaust pressure, the improvement comprising:

means effective during the predetermined engine operating condition at which the EGR valve is closed to generate and store a reference pressure value that establishes a predetermined relationship between the reference pressure value and the pressure in the pressure chamber, the stored reference pressure value comprising a calibration value that is a measure of the exhaust pressure at the predetermined engine operating condition; and means effective during other engine operating conditions to generate a reference pressure value that is substantially equal to the calibration value adjusted by an amount in accord with an EGR schedule dependent upon the engine operating condition, whereby the EGR control system is periodically recalibrated during engine operation with reference to the exhaust pressure at the predetermined engine operating condition.

2. An EGR control system for a motor vehicle combustion engine having an induction passage for induction air flow and an exhaust passage characterized by an exhaust pressure therein, the system comprising:

an EGR passage interconnecting the exhaust and induction passages effective to selectively return a portion of the exhaust gases from the exhaust passage to the induction passage, the EGR passage including a flow restriction and an adjustable EGR valve which define a pressure chamber therebetween, the flow of exhaust gases through the EGR passage depending on the difference between the pressure in the pressure chamber and the exhaust pressure;

means responsive to an EGR control signal effective to establish a reference pressure value;

means responsive to the pressure in the chamber and the reference pressure value effective to adjust the EGR valve to establish an EGR rate which establishes a pressure in the pressure chamber substantially equal to the reference pressure value;

means effective during a predetermined engine operating condition to close the EGR valve, the pressure in the pressure chamber when the EGR valve is closed being equal to the exhaust pressure;

means effective during the predetermined engine operating condition to generate and store an EGR control signal that establishes a reference pressure value having a predetermined relationship to the pressure in the pressure chamber and which comprises a calibration value that is a measure of the exhaust pressure at the predetermined engine operating condition;

means effective to store a schedule of calibration offset control values having a value dependent on the engine operating condition and which represents a desired proportion of exhaust gas recirculation; and means effective during other engine operating conditions to generate the EGR control signal in accord with the sum of the calibration value and the schedule of calibration offset control values, whereby the EGR control system is periodically recalibrated during engine operation with reference to the exhaust pressure at the predetermined engine operating condition.

3. An EGR control system for a motor vehicle combustion engine having an air induction passage, an exhaust passage and an EGR passage interconnecting the exhaust and induction passages effective to selectively return a portion of the exhaust gases from the exhaust passage to the induction passage through a flow restriction and an adjustable EGR valve which define a pressure chamber therebetween, the system comprising:

a pressure responsive operator coupled with the EGR valve and responsive to a pressure signal applied thereto for operating the EGR valve from a closed position at atmospheric pressure to an open position dependent upon the value of a vacuum signal applied thereto to variably adjust the proportion of EGR recirculated through the EGR passage;

means responsive to an engine idle condition effective to apply atmospheric pressure to the pressure responsive operator so that the EGR valve is closed at engine idle, the pressure in the pressure chamber when said EGR valve is closed being equal to the exhaust pressure at the engine idle condition;

a transducer effective to supply a controlled vacuum signal to the pressure responsive operator for controlling the proportion of EGR, the transducer including (A) a regulating diaphragm defining a portion of a control pressure chamber, (B) means effective to couple the pressure in the pressure chamber to the control pressure chamber, the control pressure tending to move the regulating diaphragm in a first direction, (C) means effective to provide a bias force tending to move the diaphragm in a second direction opposing the first direction, the bias comprising a reference pressure provided at least in part by a winding responsive to a controlled current therethrough to control the reference pressure, and (D) means positioned by the diaphragm effective to provide a vacuum signal to the pressure responsive operator varying in direction tending to adjust the EGR valve to provide a pressure in the control chamber equal to the reference pressure;

means effective to supply a controlled signal to the winding in accord with the sum of a calibration value and an offset value representing a desired proportion of exhaust gas recirculation;

means responsive during engine idle condition effective to progressively adjust the signal to the winding until the reference pressure attains a value that is effective to move the diaphragm to a predetermined position representing a predetermined relationship between the reference pressure and the exhaust back pressure at idle; and means effective to store the value of the signal to the winding when said predetermined relationship is attained, the stored value comprising the calibration value, whereby during engine off-idle conditions the proportion of exhaust gases is provided in accord with the calibration value and the scheduled offset value so that the EGR control system is independent of control system exhaust system variances.

* * * * *